US011711328B2

United States Patent
Asayama

(10) Patent No.: US 11,711,328 B2
(45) Date of Patent: Jul. 25, 2023

(54) MESSAGE OUTPUT APPARATUS, LEARNING APPARATUS, MESSAGE OUTPUT METHOD, LEARNING METHOD, AND PROGRAM

(71) Applicant: Sony Interactive Entertainment Inc., Tokyo (JP)

(72) Inventor: Hirotaka Asayama, Kanagawa (JP)

(73) Assignee: Sony Interactive Entertainment Inc., Toko (JP)

( * ) Notice: Subject to any disclaimer, the term of this patent is extended or adjusted under 35 U.S.C. 154(b) by 66 days.

(21) Appl. No.: 17/268,186

(22) PCT Filed: Aug. 20, 2018

(86) PCT No.: PCT/JP2018/030658
§ 371 (c)(1),
(2) Date: Feb. 12, 2021

(87) PCT Pub. No.: WO2020/039476
PCT Pub. Date: Feb. 27, 2020

(65) Prior Publication Data
US 2021/0245063 A1      Aug. 12, 2021

(51) Int. Cl.
*A63F 13/00* (2014.01)
*H04L 51/046* (2022.01)
(Continued)

(52) U.S. Cl.
CPC ............ *H04L 51/046* (2013.01); *A63F 13/87* (2014.09); *G06F 18/214* (2023.01); *G06V 20/40* (2022.01); *G06V 40/174* (2022.01); *G06V 40/28* (2022.01)

(58) Field of Classification Search
CPC ............... G07F 17/3239; G07F 17/323; G07F 17/3232; G07F 17/3237
See application file for complete search history.

(56) References Cited

U.S. PATENT DOCUMENTS

| | | | |
|---|---|---|---|
| 8,100,770 B2 * | 1/2012 | Yamazaki | A63F 13/23 463/40 |
| 9,421,456 B2 * | 8/2016 | Okamoto | A63F 13/10 |

(Continued)

FOREIGN PATENT DOCUMENTS

| JP | 2011008825 A | 1/2011 |
|---|---|---|
| JP | 2013236833 A | 11/2013 |

(Continued)

OTHER PUBLICATIONS

International Preliminary Report on Patentability and Written Opinion for corresponding PCT Application No. JP2018/030658, 13 pages, dated Mar. 4, 2021.

(Continued)

*Primary Examiner* — David L Lewis
*Assistant Examiner* — Eric M Thomas
(74) *Attorney, Agent, or Firm* — Matthew B. Dernier, Esq.

(57) ABSTRACT

Provided are a message output apparatus, a learning apparatus, a message output method, a learning method, and a program that allow a user to feel as if communication is being performed. An input section inputs, to a learned machine learning model that has been learned using learning data that includes learning input data including a plurality of consecutive frames of learning images and teaching data including a message associated with the learning input data, target input data including at least a plurality of consecutive frames of target images. A message identification section identifies a message according to output produced when the target input data is input to the machine learning model. A message output section outputs the identified message.

13 Claims, 5 Drawing Sheets

(51) Int. Cl.
      *A63F 13/87*     (2014.01)
      *G06V 20/40*     (2022.01)
      *G06V 40/20*     (2022.01)
      *G06V 40/16*     (2022.01)
      *G06F 18/214*   (2023.01)

(56) References Cited

U.S. PATENT DOCUMENTS

2010/0075749 A1*   3/2010   Seshadri ................ A63F 13/73
                                                                          463/30
2012/0048004 A1*   3/2012   Miyanaga ............ A63F 13/245
                                                                          73/65.01

FOREIGN PATENT DOCUMENTS

| JP | 2014149713 A | 8/2014 |
| JP | 2015043831 A | 3/2015 |
| JP | 2015211290 A | 11/2015 |
| JP | 2017182505 A | 10/2017 |
| JP | 2017182603 A | 10/2017 |
| JP | 2017205189 A | 11/2017 |
| JP | 6337183 B1 | 6/2018 |

OTHER PUBLICATIONS

Decision to Grant a Patent for corresponding JP Application No. JP2020-537908, 2 pages, dated Dec. 22, 2021.
International Search Report for corresponding PCT Application No. JP2018/030658, 3 pages, dated Sep. 25, 2018.
Notice of Reasons for Refusal for corresponding JP Application No. 2022-008101, 10 pages, dated Feb. 21, 2023.

* cited by examiner

MESSAGE OUTPUT APPARATUS, LEARNING APPARATUS, MESSAGE OUTPUT METHOD, LEARNING METHOD, AND PROGRAM

TECHNICAL FIELD

The present invention relates to a message output apparatus, a learning apparatus, a message output method, a learning method, and a program.

BACKGROUND ART

There have been known techniques to promote communication by allowing sharing of character strings of messages posted by users such as players and audiences and audio of messages produced thereby, for example, in live broadcasting of games, sports spectating, and the like.

SUMMARY

Technical Problem

Here, if a user such as player or audience can feel as if the above communication is being performed even in a situation where he or she is alone, there is a prospect that the user in question will enjoy live broadcasting of games, sports spectating, and the like more.

The present invention has been devised in light of the foregoing problem, and it is an object of the present invention to provide a message output apparatus, a learning apparatus, a message output method, a learning method, and a program that allow a user to feel as if communication is being performed.

Solution to Problem

In order to solve the above problem, a message output apparatus according to the present invention includes a learned machine learning model, an input section, a message identification section, and a message output section. The learned machine learning model has been learned using learning data that includes learning input data including a plurality of consecutive frames of learning images and teaching data including a message associated with the learning input data. The input section inputs, to the learned machine learning model, target input data including at least a plurality of consecutive frames of target images. The message identification section identifies a message according to output produced when the target input data is input to the machine learning model. The message output section outputs the identified message.

In a mode of the present invention, the input section inputs, to the machine learning model, the target input data generated while a game is played and including at least the plurality of consecutive frames of target images representing a playing status of the game in question, and the message output section outputs the identified message while the game is played.

In this mode, the learning input data may further include information regarding a player associated with the learning image, and the target input data may further include information regarding the player who is playing the game.

Here, the player information may include information regarding controller inputs made by the player.

In this case, the player information may include a value representing a frequency of controller inputs.

Also, in this mode, the player information may include a captured face image of the player.

Also, in a mode of the present invention, the learning input data includes a message different from the message represented by the teaching data, and the target input data further includes a message already output from the message output section.

Also, a learning apparatus according to the present invention includes a learning data acquisition section and a learning section. The learning data acquisition section acquires learning data that includes learning input data including a plurality of consecutive frames of learning images and teaching data including a message associated with the learning input data. The learning section learns a machine learning model using the learning data.

A mode of the present invention further includes a learning data generation section that generates the learning data on the basis of delivery data representing a delivery status of a game that is being delivered or was delivered.

Also, a message output method according to the present invention includes a step of inputting, to a learned machine learning model that has been learned using learning data including learning input data including a plurality of consecutive frames of learning images and teaching data including a message associated with the learning input data, target input data including at least a plurality of consecutive frames of target images, a step of identifying a message according to output produced when the target input data is input to the machine learning model, and a step of outputting the identified message.

Also, a learning method according to the present invention includes a step of acquiring learning data including learning input data including a plurality of consecutive frames of learning images and teaching data including a message associated with the learning input data and a step of learning a machine learning model using the learning data.

Also, a program according to the present invention causes a computer to perform a procedure of inputting, to a learned machine learning model that has been learned using learning data including learning input data including a plurality of consecutive frames of learning images and teaching data including a message associated with the learning input data, target input data including at least a plurality of consecutive frames of target images, a procedure of identifying a message according to output produced when the target input data is input to the machine learning model, and a procedure of outputting the identified message.

Also, another program according to the present invention causes a computer to perform a procedure of acquiring learning data including learning input data including a plurality of consecutive frames of learning images and teaching data including a message associated with the learning input data and a procedure of learning a machine learning model using the learning data.

DESCRIPTION OF EMBODIMENT

A detailed description will be given below of an embodiment of the present invention on the basis of drawings.

Figure 1:
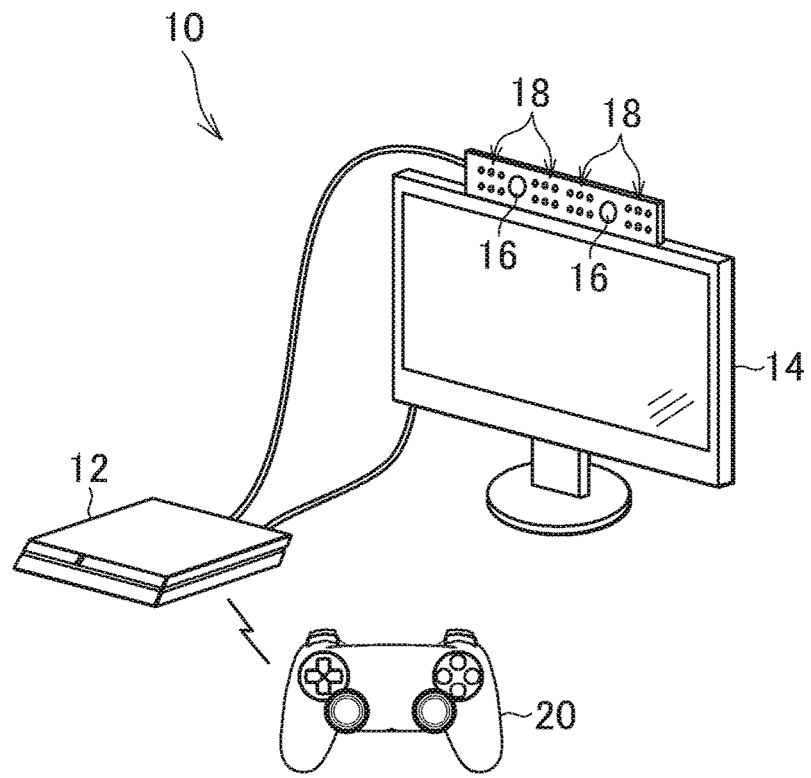
FIG. 1 is a diagram illustrating an example of an overall configuration of an entertainment system according to an embodiment of the present invention.

FIG. 1 is a diagram illustrating an example of an overall configuration of an entertainment system 10 according to the embodiment of the present invention. The entertainment system 10 according to the present embodiment includes an entertainment apparatus 12, a display 14, cameras 16, microphones 18, a controller 20, and the like.

The entertainment apparatus 12 according to the present embodiment is, for example, a computer such as a game console, a DVD (Digital Versatile Disc) player, or a Blu-ray (registered trademark) player. The entertainment apparatus 12 according to the present embodiment generates video and audio by executing a stored game program or a game program recorded on an optical disc, reproducing content, or by other means. Then, the entertainment apparatus 12 according to the present embodiment outputs, to the display 14, a video signal representing generated video and an audio signal representing generated audio.

Figure 2:
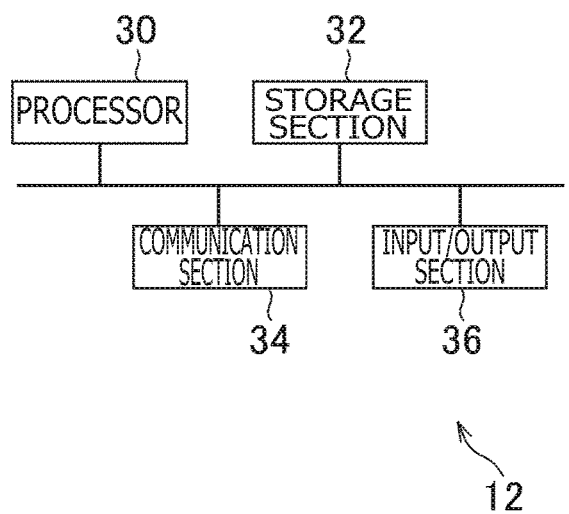
FIG. 2 is a diagram illustrating a configuration example of the entertainment apparatus according to the embodiment of the present invention.

The entertainment apparatus 12 according to the present embodiment includes, for example, a processor 30, a storage section 32, a communication section 34, and an input/output section 36 as illustrated in FIG. 2.

The processor 30 is a program-controlled device such as a CPU (Central Processing Unit) that operates in accordance with a program installed in the entertainment apparatus 12. The processor 30 according to the present embodiment also includes a GPU (Graphics Processing Unit) that draws an image to a frame buffer on the basis of a graphics command and data supplied from the CPU.

The storage section 32 is, for example, a storage element such as a ROM (Read-Only Memory) or a RAM (Random Access Memory), a hard disk drive, or the like. The storage section 32 stores programs executed by the processor 30 or the like. Also, the storage section 32 according to the present embodiment has a frame buffer area where the GPU draws an image.

The communication section 34 is, for example, a communication interface such as a wireless LAN (Local Area Network) module.

The input/output section 36 is an input/output port such as an HDMI (registered trademark) (High-Definition Multimedia Interface) port or a USB (Universal Serial Bus) port.

The display 14 is, for example, a liquid crystal display and displays video represented by a video signal supplied from the entertainment apparatus 12. Also, the display 14 outputs audio represented by an audio signal output from the entertainment apparatus 12.

Each of the cameras 16 is, for example, a device such as a digital camera that outputs, to the entertainment apparatus 12, data representing how it looks around the camera 16 such as captured image of a subject.

Each of the microphones 18 is a device that acquires surrounding audio and outputs audio data representing the audio to the entertainment apparatus 12.

The entertainment apparatus 12 and the display 14 are connected, for example, via an HDMI cable. The entertainment apparatus 12, the cameras 16, and the microphones 18 are connected, for example, via AUX (Auxiliary) cables.

The controller 20 is an operation input apparatus for making operation inputs to the entertainment apparatus 12. The user can make a variety of operation inputs with the controller 20 by pressing directional keys and buttons and tilting operation sticks of the controller 20. Then, in the present embodiment, the controller 20 outputs input data associated with operation inputs to the entertainment apparatus 12. Also, the controller 20 according to the present embodiment includes a USB port. Then, the controller 20 can output input data to the entertainment apparatus 12 in a wired manner by connecting to the entertainment apparatus 12 with a USB cable. Also, the controller 20 according to the present embodiment includes a wireless communication module or the like, thus allowing to output input data to the entertainment apparatus 12 in a wireless manner.

Also, the controller 20 may include an acceleration sensor, a pressure-sensitive sensor, a touch pad, or the like. Then, the controller 20 may send, to the entertainment apparatus 12, sensing data representing a measured value of a sensor included in the controller 20.

In the present embodiment, for example, as the entertainment apparatus 12 executes a game program, video and audio representing the game playing status are generated. Then, the video in question appears on the display 14 watched by the player of the game in question whereas the audio is output from the display 14.

Figure 3:
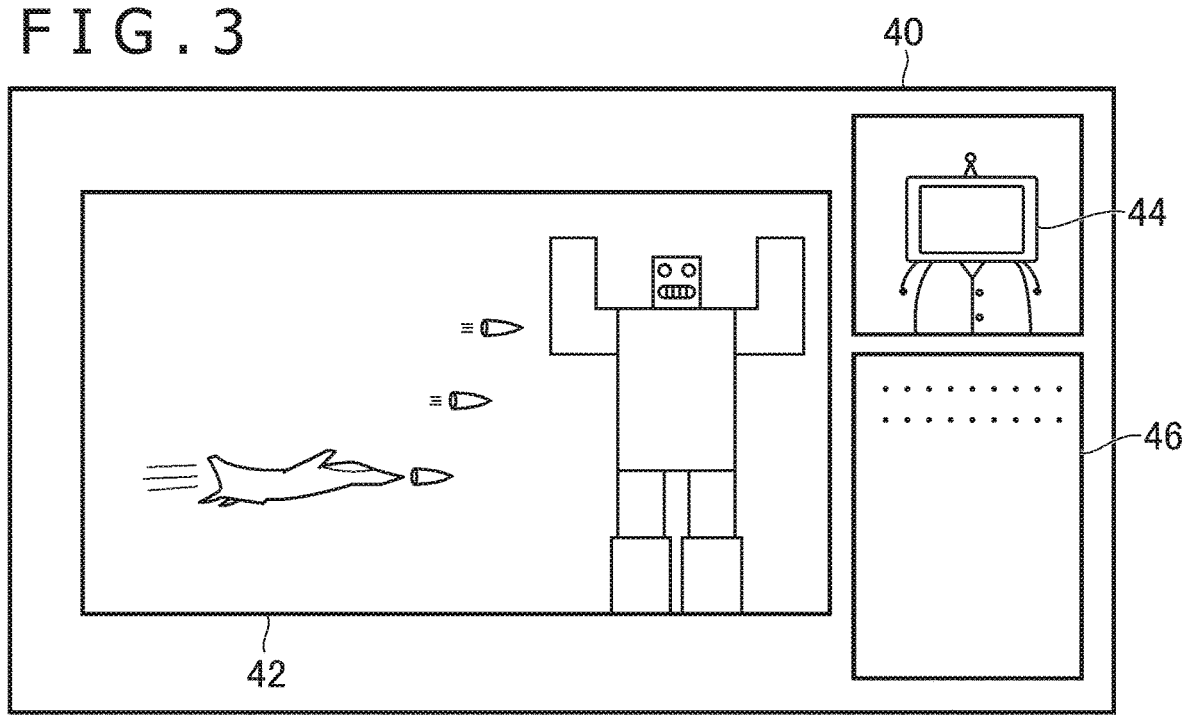
FIG. 3 is a diagram illustrating an example of a game screen.

FIG. 3 is a diagram illustrating an example of a game screen 40 displayed on the display 14 in the present embodiment. In the example illustrated in FIG. 3, a playing status image 42 that is a frame image representing the game playing status is disposed on the left in the game screen 40. Also, for example, an image of a character 44 that broadcasts live the game playing status is disposed at the upper right corner of the game screen 40. Then, a character string representing a message according to the game playing status is displayed in a lower-right message area 46 as a line spoken by the character 44 in question, and audio representing the message in question is output from the display 14.

Then, in the present embodiment, for example, a message is output that is identified by using a learned machine learning model such as neural network or support vector machine. A description will be given below of functions of and processes performed by the entertainment apparatus 12 according to the present embodiment with emphasis on learning of the machine learning model in question and output of messages using the learned machine learning model.

Figure 4:
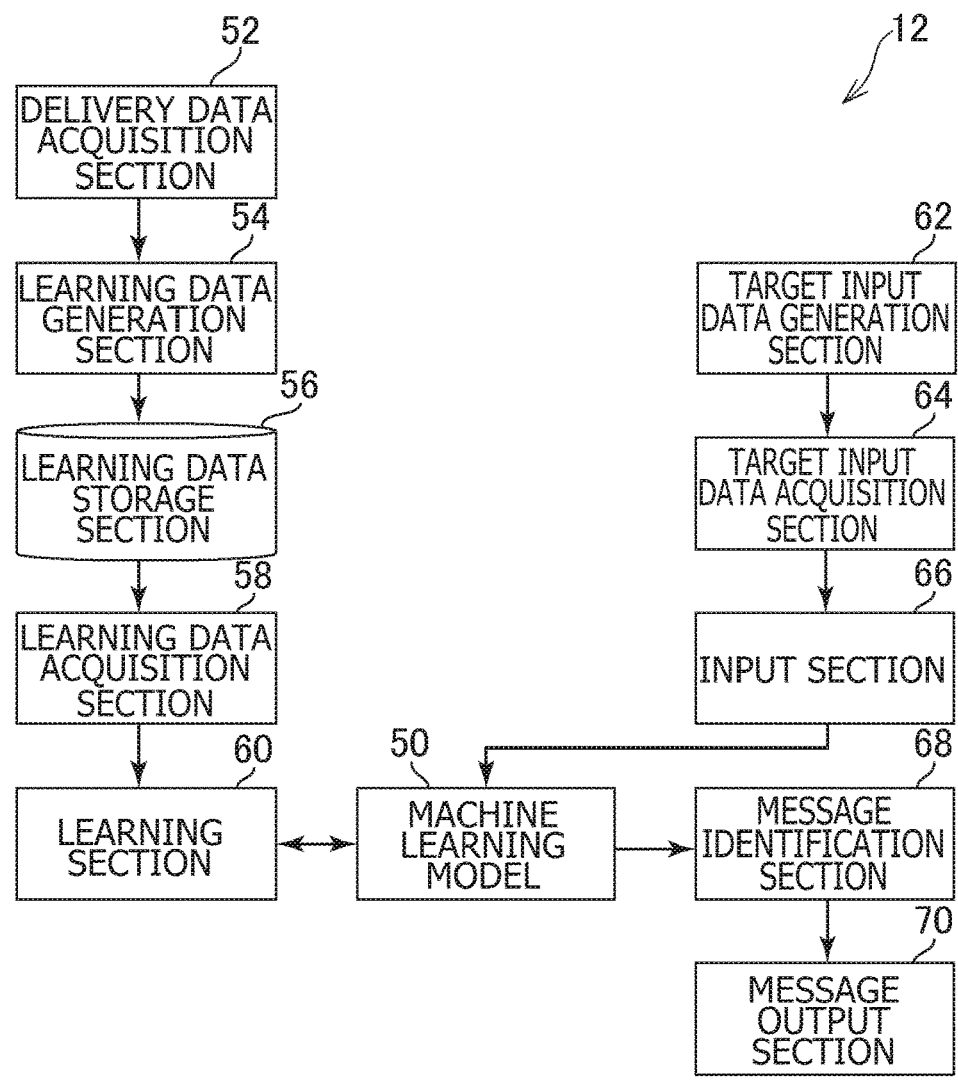
FIG. 4 is a functional block diagram illustrating examples of functions implemented in the entertainment apparatus according to the embodiment of the present invention.

FIG. 4 is a functional block diagram illustrating examples of functions incorporated in the entertainment apparatus 12 according to the present embodiment. It should be noted that there is no need to implement all the functions illustrated in FIG. 4 in the entertainment apparatus 12 according to the present embodiment and that functions other than those illustrated in FIG. 4 may be implemented.

As illustrated in FIG. 4, the entertainment apparatus 12 functionally includes, for example, a machine learning model 50, a delivery data acquisition section 52, a learning data generation section 54, a learning data storage section 56, a learning data acquisition section 58, a learning section 60, a target input data generation section 62, a target input data acquisition section 64, an input section 66, a message identification section 68, and a message output section 70.

The machine learning model 50 is mainly implemented by the processor 30 and the storage section 32. The delivery data acquisition section 52 is mainly implemented by the processor 30 and the communication section 34. The learning data generation section 54, the learning data acquisition section 58, the learning section 60, the target input data generation section 62, the target input data acquisition section 64, the input section 66, and the message identification section 68 are mainly implemented by the processor 30. The learning data storage section 56 is mainly implemented by the storage section 32. The message output section 70 is mainly implemented by the processor 30 and the input/output section 36.

The functions of the machine learning model 50, the delivery data acquisition section 52, the learning data generation section 54, the learning data storage section 56, the learning data acquisition section 58, and the learning section 60 are equivalent to those of a learning apparatus that learns the machine learning model 50.

The functions of the machine learning model 50, the target input data generation section 62, the target input data acquisition section 64, the input section 66, the message identification section 68, and the message output section 70 are equivalent to those of a message output apparatus that outputs a message using the learned machine learning model 50.

The above functions may be implemented by executing, with the processor 30, a program that has been installed in the entertainment apparatus 12, a computer, and includes instructions corresponding to the above functions. This program may be supplied via a computer-readable information storage medium such as an optical disc, a magnetic disk, a magnetic tape, a magneto-optical disk, or a flash memory, or via the Internet or other means.

The machine learning model 50 is, for example, a machine learning model such as a neural network or a support vector machine in the present embodiment.

The delivery data acquisition section 52 acquires, for example, delivery data representing a delivery status of a game that is being delivered or was delivered from a game live video delivery site or other site in the present embodiment.

Figure 5:
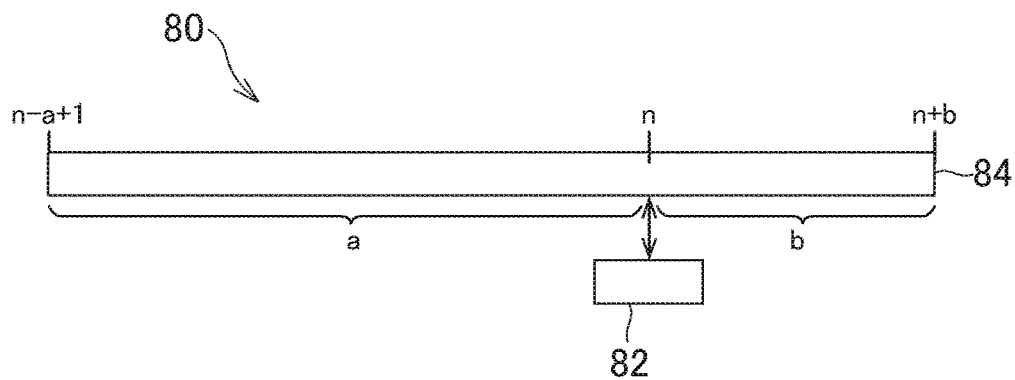
FIG. 5 is a diagram schematically illustrating an example of learning data.

The learning data generation section 54 generates, for example, learning data 80 schematically illustrated in FIG. 5 in the present embodiment. Here, for example, the learning data 80 may be generated on the basis of delivery data acquired by the delivery data acquisition section 52.

The learning data generation section 54 extracts, from delivery data, messages that occur including character strings of messages posted by users such as players and audiences and displayed on the screen, audio messages produced by users such as players and audiences, and the like. The messages in question will be hereinafter referred to as learning messages 82. Here, for example, a message that occurs a given amount of time or more from when an immediately previous message occurred may be extracted as the learning message 82. Also, for example, a given number of messages that occur consecutively a given amount of time or more from when an immediately previous message occurred may be extracted as the learning messages 82. Alternatively, for example, a series of messages that occur within a given amount of time may be extracted as the learning messages 82.

Then, the learning data generation section 54 identifies, for example, a frame equivalent to a time when an extracted message occurred. Here, in the case where a plurality of messages are extracted, for example, the frame equivalent to the time when the first message occurred may be identified. We assume here that an identified frame number is "n." Then, the learning data generation section 54 extracts, from the delivery data, (a+b) frame images whose frame numbers are equal to or larger than (n−a+1) and equal to or smaller than (n+b). Frame images extracted in this manner will be hereinafter referred to as learning images 84.

Then, the learning data generation section 54 generates, for example, the learning data 80 that includes the plurality of consecutive frames of learning images 84 as learning input data and the extracted learning message 82 as teaching data. Here, the learning data generation section 54 may generate the learning data 80 that includes the plurality of consecutive frames of learning image 84 representing a game playing status as learning input data and the extracted learning message 82 as teaching data. Here, for example, the learning data 80 that includes the (a+b) learning images 84 as learning input data is generated. In this example, the extracted learning message 82, teaching data included in the learning data 80, is a message included in the learning data 80 and issued while the (a+b) consecutive frames of learning image 84 are displayed. Then, the learning data generation section 54 stores the generated learning data 80 in the learning data storage section 56.

It should be noted that, as will be described later, teaching data included in the learning data 80 may include a label representing emotion when the message in question is issued.

Also, teaching data included in the learning data 80 may include a label representing whether or not a message has been issued.

In this case, the learning data generation section 54 may generate, for example, the learning data 80 that includes the plurality of consecutive frames of learning images 84 as learning input data and the extracted learning message 82 as teaching data and a label representing issuance of a message as teaching data.

Also, the learning data generation section 54 may extract, from delivery data, a plurality of frame images (e.g., (a+b) frame images) while no message is issued as the learning image 84. Then, the learning data generation section 54 may generate the learning data 80 that includes the extracted learning image 84 as learning input data and a label representing that no message has been issued as teaching data.

The learning data storage section 56 stores, for example, the learning data 80 that includes learning input data and teaching data in the present embodiment. Here, learning input data may include the plurality of consecutive frames of learning images 84. Also, teaching data may include the learning message 82 associated with the learning input data in question (for example, the learning message 82 issued while the learning image 84 in question is displayed).

The learning data acquisition section 58 acquires, for example, the learning data 80 stored in the learning data storage section 56 in the present embodiment.

The learning section 60 learns the machine learning model 50 using the learning data 80 acquired by the learning data acquisition section 58. Here, for example, supervised learning that updates a parameter value set in the machine learning model 50 may be carried out on the basis of a difference between output produced when learning input data included in the learning data 80 is input to the machine learning model 50 and teaching data included in the learning data 80.

The target input data generation section 62 generates, for example, target input data including at least a plurality of consecutive frames of target images in the present embodiment. Here, the target input data generation section 62 may generate, while a game is played, target input data including at least a plurality of consecutive frames of target images representing the playing status of the game. Here, we assume, for example, that the frame number of the playing status image 42 being displayed is "m." In this case, most recently displayed (a+b) frames of the playing status image 42 are acquired whose frame numbers are equal to or larger than (m−a−b+1) and equal to or smaller than m. Then, target input data that includes (a+b) frames of the playing status image 42 in question as a target image is generated.

The target input data acquisition section 64 acquires, for example, target input data generated by the target input data generation section 62 in the present embodiment.

The input section 66 inputs, for example, the target input data acquired by the target input data acquisition section 64 to the learned machine learning model 50 in the present embodiment.

The message identification section 68 identifies, for example, a message according to output produced when the target input data acquired by the target input data acquisition section 64 is input to the learned machine learning model 50 in the present embodiment.

The message output section 70 outputs, for example, the message identified by the message identification section 68 in the present embodiment. Here, the message output section 70 may output the identified message while a game is played. The message output section 70 may display, for example, a character string representing the message identified by the message identification section 68 in the message area 46. Also, the message output section 70 may output generated audio by using an audio synthesis technique on the basis of the message identified by the message identification section 68.

In the present embodiment, a message according to the game playing status is output using the learned machine learning model 50 that has learned character strings of messages posted by users such as players and audiences and audio of messages produced thereby. Thus, according to the present embodiment, even in a situation where a player is playing alone, he or she can feel as if communication is being performed while the game is played.

It should be noted that the present invention is not limited in application to the output of a message to a player. For example, the present embodiment may be applied to output a message according to a playing status to an audience viewing game playing video or a message according to a match status to an audience watching sports match video. In these cases, users such as audiences and viewers can also feel as if communication is being performed.

It should be noted that in the case where the number of images that can be input to the machine learning model 50 is fixed, the number of learning images 84 included in learning input data and the number of target images included in target input data are required to be the same given number. Here, in the case where the machine learning model 50 is a neural network, the number of image frames that can be input may be variable depending on the type of the neural network. In such a case, the number of learning images 84 included in each of the plurality of pieces of learning data 80 and the number of target images included in target input data need not be the same.

Here, the above delivery data may include, for example, information regarding a player playing a game. The player information in question may be collected, for example, from the entertainment system 10 connected to a game live video delivery site. Then, for example, the learning data generation section 54 may generate the learning data 80 that further includes player information associated with the learning image 84 in learning input data. Then, in this case, the target input data generation section 62 may generate target input data that further includes information regarding the player playing the game.

Player information included in learning input data may include, for example, information regarding controller inputs made by the player such as key log data. For example, the learning data generation section 54 may identify information regarding controller inputs made by the player while the plurality of frames of learning images 84 included in the learning data 80 are displayed. Then, the learning data generation section 54 may generate the learning data 80 that further includes information regarding the identified controller inputs in learning input data.

In this case, the target input data generation section 62 may generate target input data that further includes information regarding the player playing the game while the plurality of most recent frames ((a+b) frames in the above example) of playing status images 42 are displayed. For example, target input data that further includes information regarding controller inputs made by the player playing the game during the period of time in question may be generated.

Also, for example, the learning data generation section 54 may identify the frequency of inputs made to the controller 20 while the plurality of frames of learning images 84 included in the learning data 80 are displayed on the basis of player control input information during the period of time in question. Here, for example, the number of inputs made to the controller 20 per unit time during the period of time in question may be identified as an input frequency. Then, the learning data generation section 54 may generate the learning data 80 that further includes a value representing the input frequency in learning input data.

In this case, the target input data generation section 62 may identify the frequency of inputs made to the controller 20 while the plurality of most recent frames of playing status images 42 are displayed on the basis of player control input information during the period of time in question. Then, the learning data generation section 54 may generate target input data that further includes a value representing the input frequency in question.

Further, player's face images that are face images of the player captured by the cameras 16, for example, may be included in player information that is included in learning input data. For example, the learning data generation section 54 may generate the learning data 80 that further includes, in learning input data, player's face images captured while the plurality of frames of learning images 84 included in the learning data 80 are displayed.

In this case, the target input data generation section 62 may generate target input data that further includes player's face images captured by the camera 16 while the plurality of most recent frames of playing status images 42 are displayed.

Also, player information included in learning input data may include, for example, sensing data representing a measured value of the sensor included in the controller 20 while the plurality of frames of learning images 84 included in the learning data 80 are displayed. Here, as described above, the sensor in question may be an acceleration sensor, a pressure-sensitive sensor, a touch pad, or the like. Also, as described above, the sensing data in question may be sent from the controller 20 to the entertainment apparatus 12. In this case, the target input data generation section 62 may generate target input data that further includes sensing data representing a measured value of the sensor included in the controller 20 while the plurality of most recent frames of playing status images 42 are displayed.

Also, for example, the player information in question in a game played with a head-mounted display (HMD) worn may include sensing data that can be acquired from the HMD and that represents a measured value of the sensor such as line-of-sight sensor or acceleration sensor included in the HMD. For example, the learning data 80 that further includes, in learning input data, sensing data acquired from the HMD while the plurality of frames of learning images 84 included in the learning data 80 are displayed may be generated. In this case, the target input data generation section 62 may generate target input data that further includes sensing data acquired from the HMD while the plurality of most recent frames of playing status images 42 are displayed.

For example, player information acquired as described above is presumably different between the case where the game status is laid-back and the case where the game status is urgent. Specifically, for example, the frequency of inputs to the controller 20 is presumably higher in the case where the game status is urgent than in the case where the game status is laid-back. Also, for example, the controller 20, the line of sight, and the HMD presumably move more intensely in the case where the game status is urgent than in the case where the game status is laid-back. Also, for example, the player's facial expression is different between the case where the game status is laid-back and the case where the game status is urgent. Thus, player information is highly likely to correspond to the message to be output. For this reason, for example, there is a prospect that a more accurate message will be output from the machine learning model 50 by using the above player information to learn the machine learning model 50.

Also, learning input data may include a message different from the learning message 82 included in the learning data 80 as teaching data. Here, for example, the learning data generation section 54 may identify messages that occur from a given period of time preceding the time when the learning message 82 included in the learning data 80 as teaching data occurs to the time when the learning message 82 in question occurs. Then, the learning data generation section 54 may generate the learning data 80 that further includes the identified messages in learning input data. In this case, the target input data generation section 62 may generate target input data that further includes messages output from the message output section 70 from a given period of time earlier up to the present time.

A message is often issued in response to a message issued earlier than the message in question. Therefore, there is a prospect that a more accurate message will be output from the machine learning model 50, for example, by using a message different from the message in question such as a message that occurred earlier than the message in question to learn the machine learning model 50.

Also, learning input data may include data representing a title or type of the game being played. In this case, the target input data generation section 62 may generate target input data that includes data representing the title or type of the game being played.

Also, as described above, in the case where the teaching data included in the learning data 80 includes a label representing an emotion, the message identification section 68 identifies the emotion on the basis of the output from the learned machine learning model 50. Then, the message output section 70 may output a message according to the identified emotion. For example, audio representing the identified emotion may be output. Also, for example, the character 44 that moves in a manner according to the identified emotion may be displayed.

Here, for example, the learning data generation section 54 may estimate the emotion on the basis of the above player information. Then, the learning data generation section 54 may generate the learning data 80 that further includes a label representing the estimated emotion in teaching data.

Figure 6:
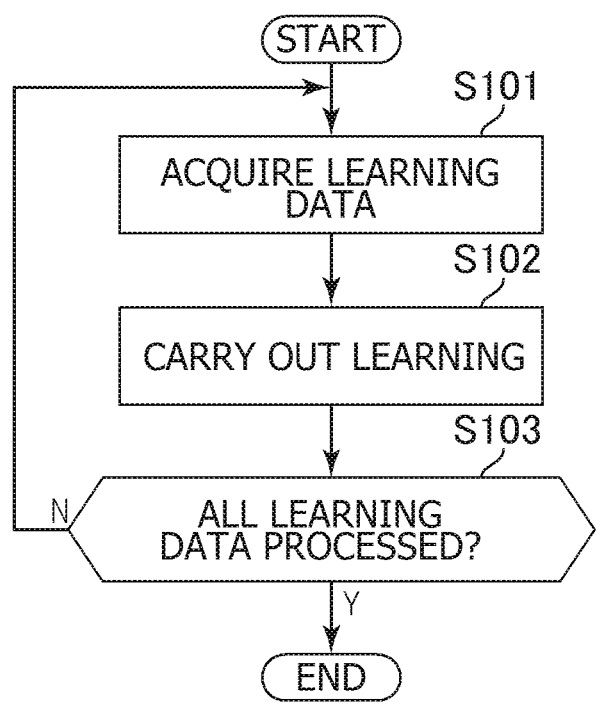
FIG. 6 is a flowchart illustrating an example of a flow of a learning process handled by the entertainment apparatus according to the embodiment of the present invention.

A description will be given here of an example of a flow of a learning process of learning the machine learning model 50 handled by the entertainment apparatus 12 according to the present embodiment with reference to the flowchart illustrated in FIG. 6. We assume here that the plurality of pieces of learning data 80 are stored in the learning data storage section 56.

First, the learning data acquisition section 58 acquires a piece of data, not used to learn the machine learning model 50, from the learning data 80 stored in the learning data storage section 56 (S101).

Then, the learning section 60 learns the machine learning model 50 using the learning data 80 acquired in the process in S101 (S102).

Then, the learning section 60 confirms whether or not all the learning data 80 stored in the learning data storage section 56 has been subjected to the process in S102 (S103).

Here, in the case where it is confirmed that all the learning data 80 stored in the learning data storage section 56 has yet to be subjected to the process in S102 (N in S103), the process returns to the process in step S101.

In the case where it is confirmed that all the learning data 80 stored in the learning data storage section 56 has been subjected to the process in S102 (Y in S103), the process illustrated in the present processing example is terminated.

Figure 7:
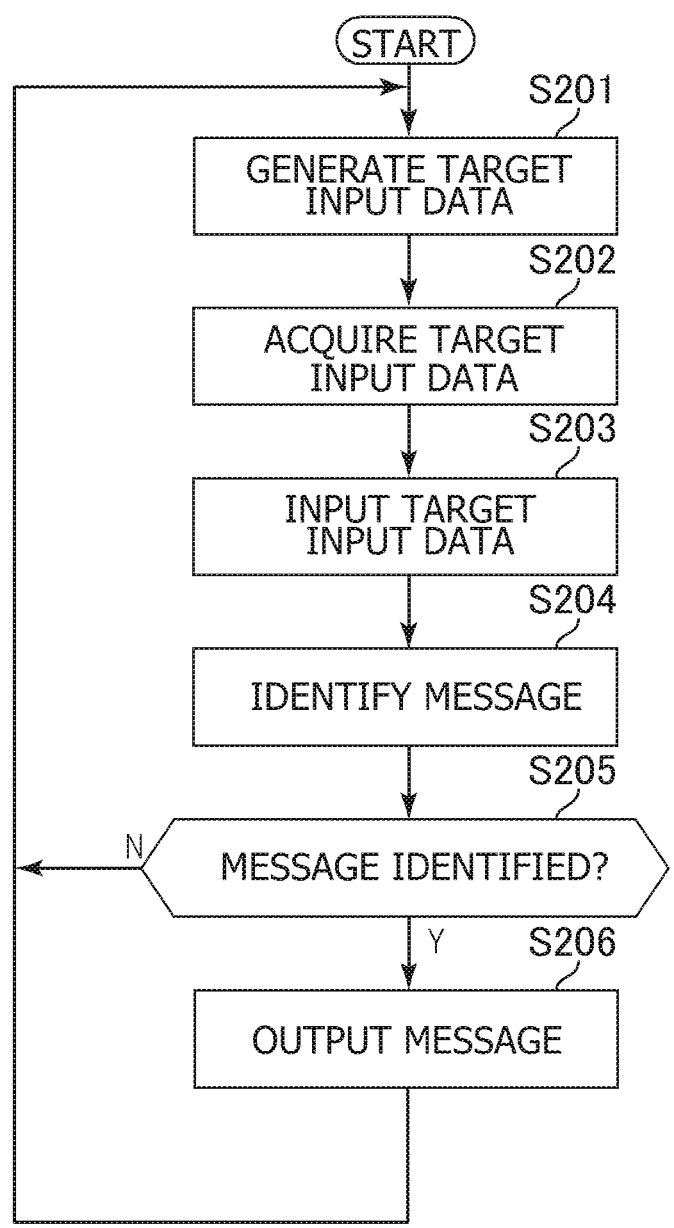
FIG. 7 is a flowchart illustrating an example of a flow of a message output process handled by the entertainment apparatus according to the embodiment of the present invention.

A description will be given next of an example of a message output process using the learned machine learning model 50 handled by the entertainment apparatus 12 according to the present embodiment with reference to the flowchart illustrated in FIG. 7. In the present processing example, we assume that the processes in S201 to S206 are repeated at a frame rate at which the playing status image 42 is displayed.

First, the target input data generation section 62 generates target input data in the frame in question (S201).

Then, the target input data acquisition section 64 acquires the target input data generated in the process in S201 (S202).

Then, the input section 66 inputs the target input data, acquired in the process in S202, to the learned machine learning model 50 (S203).

Then, the message identification section 68 identifies a message to be output on the basis of the output of the machine learning model 50 according to the input in the process in S203 (S204). A determination result may be made here as to whether or not an emotion or message has occurred as described above.

Then, the message identification section 68 confirms whether or not the message has been identified in the process in S204 (S205). In the case where it is confirmed that the message has not been identified (N in S205), the process returns to the process in step S201. In the case where it is confirmed that the message has been identified (Y in S205), the message output section 70 outputs the message identified in the process in S204 (S206), and the process returns to the process in step S201. Here, an output according to the identified emotion may be output as described above. Also, a determination result may be made as to whether or not a message has occurred.

In the above processing examples, for example, in the case where the first frame number of the playing status image 42 is "0," while the playing status image 42 whose frame number is equal to or larger than 0 and equal to or smaller than (a+b−2) is displayed, the above processes may not be performed.

Also, there is no need to repeat the processes in S201 to S206 every frame as in the above processing example. For example, the processes in S201 to S206 may be performed randomly or at given time intervals.

It should be noted that the present invention is not limited to the above embodiment.

Also, the above specific character strings and numbers and the above specific character strings and numbers in the figures are illustrative, and the present invention is not limited thereto.

The invention claimed is:

1. A message output apparatus comprising:
 a learned machine learning model that has been learned using learning data that includes learning input data including a plurality of consecutive frames of learning images and teaching data including a message associated with the learning input data;
 an input section operating to input, to the learned machine learning model, target input data including at least a plurality of consecutive frames of target images, wherein the message includes at least one of character strings and audio produced by viewers when the plurality of consecutive frames of learning images are viewed by such viewers;
 a message identification section operating to identify a message according to output produced when the target input data is input to the machine learning model such that the identified message is based on the message contained in the teaching data; and
 a message output section operating to output the identified message.

2. The message output apparatus according to claim 1, wherein
 the input section inputs, to the machine learning model, the target input data generated while a game is played and including at least the plurality of consecutive frames of target images representing a playing status of the game in question, and
 the message output section outputs the identified message while the game is played.

3. The message output apparatus according to claim 2, wherein
 the learning input data further includes information regarding a player associated with the learning image, and
 the target input data further includes information regarding the player who is playing the game.

4. The message output apparatus according to claim 3, wherein the player information includes information regarding controller inputs made by the player.

5. The message output apparatus according to claim 4, wherein the player information includes a value representing a frequency of controller inputs.

6. The message output apparatus according to claim 3, wherein
 the player information includes a captured face image of the player.

7. The message output apparatus according to claim 1, wherein
 the learning input data further includes a message different from the message represented by the teaching data, and
 the target input data further includes a message already output from the message output section.

8. The message output apparatus according to claim 1, further comprising:
 a learning data acquisition section operating to acquire the learning data that includes learning input data; and
 a learning section operating to learn the machine learning model using the learning data.

9. The learning apparatus according to claim 8, further comprising:
 a learning data generation section operating to generate the learning data on a basis of delivery data representing a delivery status of a game that is being delivered or was delivered.

10. A message output method comprising:
 inputting, to a learned machine learning model that has been learned using learning data including learning input data including a plurality of consecutive frames of learning images and teaching data including a message associated with the learning input data, target input data including at least a plurality of consecutive frames of target images, wherein the message includes at least one of character strings and audio produced by viewers when the plurality of consecutive frames of learning images are viewed by such viewers;
 identifying a message according to output produced when the target input data is input to the machine learning model such that the identified message is based on the message contained in the teaching data; and
 outputting the identified message.

11. The message output method according to claim 10, further comprising:
 acquiring the learning data including learning input data; and
 learning the machine learning model using the learning data.

12. A non-transitory, computer readable storage medium containing a program, which when executed by a computer, causes the computer to perform a message output method by carrying out actions, comprising:
 inputting, to a learned machine learning model that has been learned using learning data including learning input data including a plurality of consecutive frames of learning images and teaching data including a message associated with the learning input data, target input data including at least a plurality of consecutive frames of target images, wherein the message includes at least one of character strings and audio produced by viewers when the plurality of consecutive frames of learning images are viewed by such viewers;
 identifying a message according to output produced when the target input data is input to the machine learning model such that the identified message is based on the message contained in the teaching data; and
 outputting the identified message.

13. The non-transitory, computer readable storage medium containing a program according to claim 12, further comprising:
 acquiring the learning data including learning input data; and learning the machine learning model using the learning data.

* * * * *